United States Patent
Wu et al.

(10) Patent No.: US 7,702,440 B2
(45) Date of Patent: Apr. 20, 2010

(54) METHOD AND APPARATUS FOR DETECTING ROLLOVER OF AN AUTOMOTIVE VEHICLE BASED ON A LATERAL KINETIC ENERGY RATE THRESHOLD

(75) Inventors: Fubang Wu, Rochester Hills, MI (US); Cliff Chou, Farmington Hills, MI (US); Thiag Subbian, Farmington Hills, MI (US)

(73) Assignee: Ford Global Technologies, Dearborn, MI (US)

( * ) Notice: Subject to any disclaimer, the term of this patent is extended or adjusted under 35 U.S.C. 154(b) by 326 days.

(21) Appl. No.: 10/906,195

(22) Filed: Feb. 8, 2005

(65) Prior Publication Data

US 2006/0178808 A1 Aug. 10, 2006

(51) Int. Cl.
*B60R 22/00* (2006.01)
(52) U.S. Cl. .................................. 701/45; 701/124
(58) Field of Classification Search ................ 180/282; 280/5.502, 735, 755; 340/440; 701/37, 38, 701/45, 124
See application file for complete search history.

(56) References Cited

U.S. PATENT DOCUMENTS

| | | | |
|---|---|---|---|
| 3,804,435 A * | 4/1974 | See et al. ..................... 280/733 |
| 6,282,474 B1 * | 8/2001 | Chou et al. .................. 701/45 |
| 6,529,811 B2 | 3/2003 | Watson et al. |
| 6,654,671 B2 | 11/2003 | Schubert |
| 6,694,225 B2 | 2/2004 | Aga et al. |
| 7,076,353 B2 * | 7/2006 | Ogata et al. .................. 701/45 |
| 2002/0095244 A1 * | 7/2002 | Rhode et al. .................. 701/1 |
| 2003/0055549 A1 * | 3/2003 | Barta et al. .................. 701/70 |
| 2004/0019418 A1 * | 1/2004 | Lu et al. ...................... 701/38 |
| 2004/0199317 A1 * | 10/2004 | Ogata et al. .................. 701/45 |
| 2004/0254703 A1 * | 12/2004 | Traechtler et al. ............ 701/38 |
| 2006/0089771 A1 * | 4/2006 | Messih et al. ................ 701/45 |

OTHER PUBLICATIONS

Ralf Eger, Uwe Kiencke. Modeling of rollover sequences. Control Engineering Practice 11 (2003) 209-216.*
Examination of Rollover Crash Mechanisms and Occupant Outcomes, National Center for Statistics and Analysis, Washington D.C., Dec. 2003.
Simulation and Testing of a Suite of Field Relevant Rollovers, SAE International, Detroit, Michigan, Mar. 2004.

* cited by examiner

*Primary Examiner*—Mark Hellner
*Assistant Examiner*—Helal A Algahaim
(74) *Attorney, Agent, or Firm*—Angela M. Brunetti; Frank MacKenzie

(57) ABSTRACT

A rollover sensing system (12) that may be used in the determination of when to deploy restraints in a vehicle is disclosed herein. The rollover sensing system (12) may include lateral acceleration sensors (22), a roll rate sensor (18), and a roll angle detector (20). A control circuit (16) determines a roll moment of inertia as a function of lateral acceleration, a trip point length as a function of the lateral acceleration, and a trip point angle as a function of the lateral acceleration. The control circuit (16) also determines a rollover threshold in response to a roll rate signal, a roll angle signal, the trip point length, the roll moment of inertia, and the trip point angle. The control circuit (16) further generates a control signal for a deployment circuit in response to the rollover threshold.

14 Claims, 4 Drawing Sheets

METHOD AND APPARATUS FOR DETECTING ROLLOVER OF AN AUTOMOTIVE VEHICLE BASED ON A LATERAL KINETIC ENERGY RATE THRESHOLD

TECHNICAL FIELD

The present invention relates generally to detecting rollover of an automotive vehicle and, more specifically, to a method and apparatus particularly suited for determining a threshold for detecting rollover so as to trigger an occupant restraint system.

BACKGROUND

Occupant restraint systems, and particularly inflatable occupant restraint systems, are increasingly being used in automotive vehicles. Nearly every vehicle now produced has driver and passenger front airbags. Side airbags are also increasingly being used in automotive vehicles. Side airbags use lateral acceleration sensors to detect lateral acceleration of a vehicle and thus the presence of a side impact. In response to lateral acceleration, the side airbags are deployed in side impacts.

Another newer type of inflatable occupant restraint system is a side curtain airbag. The side curtain airbag deploys from the ceiling or near the roof header and extends downward in front of the side windows of the vehicle. This system is designed to protect occupants in rollover conditions.

Another type of non-inflatable system is a pretensioner system coupled to a seat belt. A pretensioner system reduces the amount of play (i.e., slack) in seat belts upon a sensed rollover condition.

Each of the above systems may potentially be employed during rollover of a vehicle. Commonly, an energy-based model is used to determine when rollover occurs. However, in a deployment scenario, an energy-based model may not allow enough time for full deployment.

The present invention builds upon U.S. Pat. No. 6,282,474 to the same assignee. Rollover protection systems require a significant amount of testing. The testing requires the use of destructive testing of actual vehicles. During various stages of vehicle development, these tests are performed. Using prototypes for testing requires a significant amount of time and manpower, and the prototype vehicles are very expensive. It would therefore be desirable to provide a rollover sensing algorithm that has less dependence upon testing prototypes so as to reduce overall costs to the system.

It would also be desirable to provide an accurate determination of rollover when deploying the restraints.

SUMMARY OF THE INVENTION

The present invention provides an improved rollover sensing system that may be used in the determination of when to deploy restraints in a vehicle. The rollover sensing system includes lateral acceleration sensors, a roll rate sensor, and a roll angle detector. A control circuit determines a trip point length as a function of a lateral acceleration signal. The control circuit also determines a rollover threshold in response to a roll rate signal, a roll angle signal, the trip point length, and a roll moment of inertia. The control circuit further generates a control signal in response to the rollover threshold.

The trip point angle and roll moment of inertia, both of which are determined as a function of lateral acceleration, may also be used in the rollover threshold determination.

In a further aspect of the invention, the rollover sensing system may be employed by an occupant restraint system to determine when an occupant restraint should be deployed.

In a further aspect of the invention, a method of detecting rollover in a vehicle comprises the steps of determining a lateral acceleration of the vehicle; determining a roll rate of the vehicle; determining a roll angle of the vehicle; determining a trip point length as a function of the lateral acceleration; determining a rollover threshold in response to a roll rate signal, a roll angle signal, the trip point length, and a roll moment of inertia; and generating a control signal in response to the rollover threshold.

One advantage of the invention is that a fewer number of test vehicles, less time, and fewer man-hours are required in the development of the system. Another advantage is that a robust and reliable determination of rollover is used to improve an energy-based rollover prediction.

Other objects and features of the present invention will become apparent when viewed in light of the detailed description of the preferred embodiment and when viewed in conjunction with the attached drawing figures and the appended claims.

DETAILED DESCRIPTION OF THE PREFERRED EMBODIMENT

Figure 1:
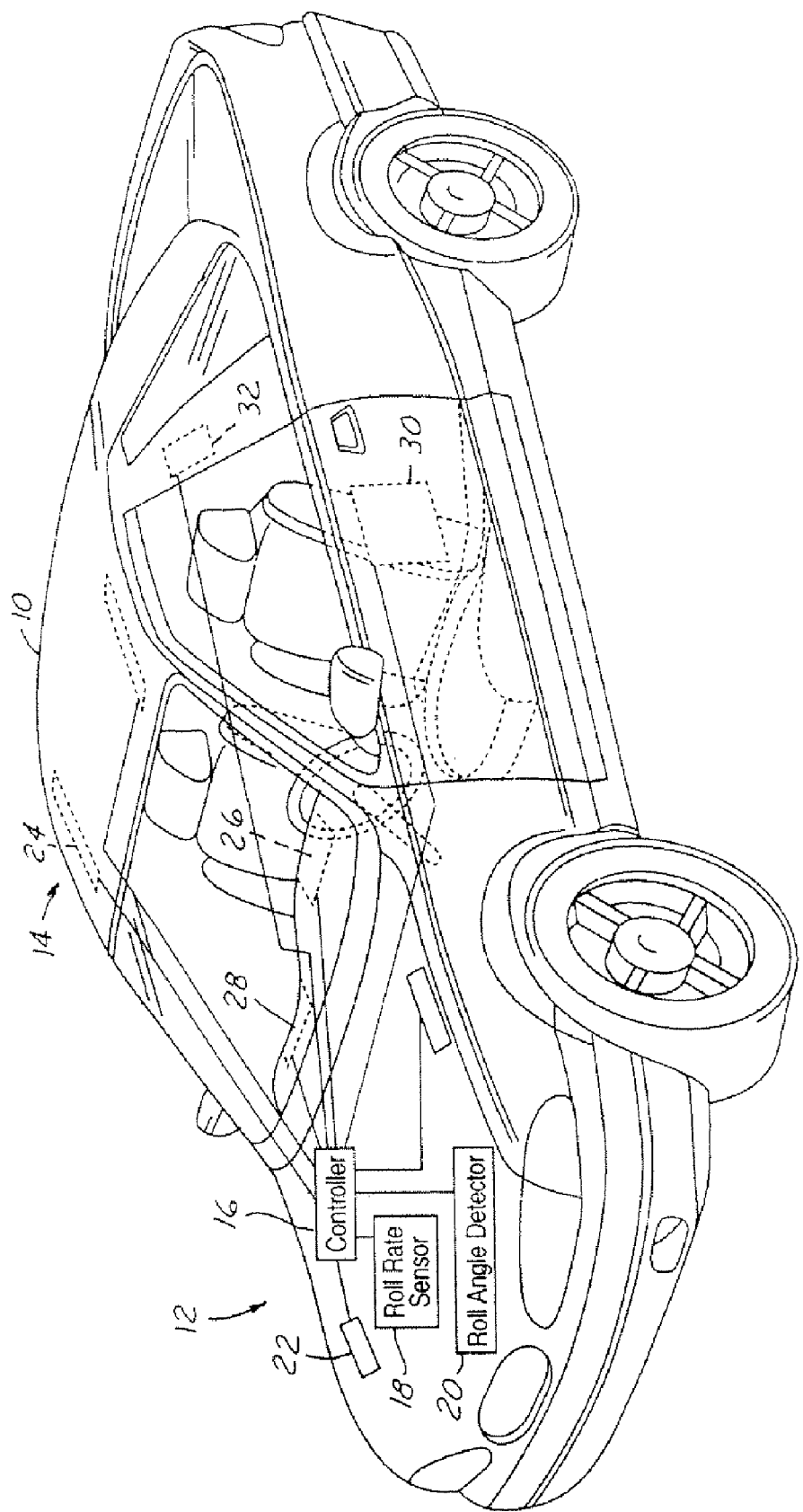
FIG. 1 is a perspective view of an automotive vehicle having a rollover sensing system according to the present invention.

In the drawing figures discussed as follows, the same reference numerals are generally used to identify the same or similar components in the various views. As herein described, the rollover detection or sensing system is suitable for use in deploying, for example, an occupant restraint system. It is understood, however, that the rollover sensing system may also be incorporated into a dynamic control system for an automotive vehicle and in other systems, as would be evident to those skilled in the art.

Referring now to FIG. 1, an automotive vehicle 10 has a rollover sensing system 12 coupled to an occupant restraint system 14. Rollover sensing system 12 includes a control circuit 16. Control circuit 16 is preferably microprocessor-based. Control circuit 16 may be shared with occupant restraint system 14. However, occupant restraint system 14 may have its own controller or control circuit. Rollover sensing system 12 comprises a roll rate sensor 18, a roll angle detector 20, and a pair of lateral acceleration sensors 22.

Roll rate sensor 18 provides a roll rate signal that corresponds to the rate of roll of the vehicle about a roll axis. Various types of roll rate sensors would be evident to those skilled in the art.

Roll angle detector 20 provides a signal indicative of the roll angle of the vehicle. The roll angle is the amount the vehicle is tilted from a horizontal position. Roll angle detector 20 may be a discrete sensor or may be a calculation based upon roll rate sensor 18. For example, if roll rate is integrated over time, an amount of roll from the at rest position may be determined. Various integration and filtering schemes to obtain the roll angle would be evident to those skilled in the art. However, if the vehicle was at rest on an incline, integrating the roll rate signal may not be entirely accurate but may be acceptable. Preferably, however, roll rate and roll angle are determined independently.

In FIG. 1, two lateral acceleration sensors 22 are illustrated. The lateral acceleration sensors 22 may be part of a side-impact detection system or may be sensors specifically designed for the rollover sensing system 12. Known lateral acceleration sensors include, for example, piezoelectric and silicon micromachined devices. Of course, one skilled in the art may recognize that only one lateral acceleration sensor 22 may alternatively be employed. For example, a lateral acceleration sensor from a dynamic control system of the vehicle 10 may be employed. The lateral acceleration sensors 22 each generate a lateral acceleration signal corresponding to lateral or sideways movement of the vehicle 10. The lateral acceleration signal is indicative of the severity of the sideways movement of the vehicle 10. Therefore, the severity and speed of a side impact or rollover may be indicated by each lateral acceleration sensor 22.

Control circuit 16 may be used to determine a rollover threshold in response to a roll rate signal and a roll angle signal. The rollover threshold is an indication of rollover of the vehicle. The control circuit 16 may also be used to calculate an adjusted threshold based on the lateral acceleration signal and the energy-based rollover threshold. Control circuit 16 may also control occupant restraint system 14.

In addition to control circuit 16, occupant restraint system 14 may include restraint devices such as an inflatable curtain airbag 24, a driver side front airbag 26, a passenger side front airbag 28, a side airbag 30, and a belt retractor 32. Of course, one or more restraint devices may be used in restraint system 14. Control circuit 16 may be used to control the actuation of each of the restraints 24 through 32. However, as one skilled in the art would recognize, various other sensors and separate controllers may also be used to control each of the occupant restraint devices 24 through 32.

Figure 2:
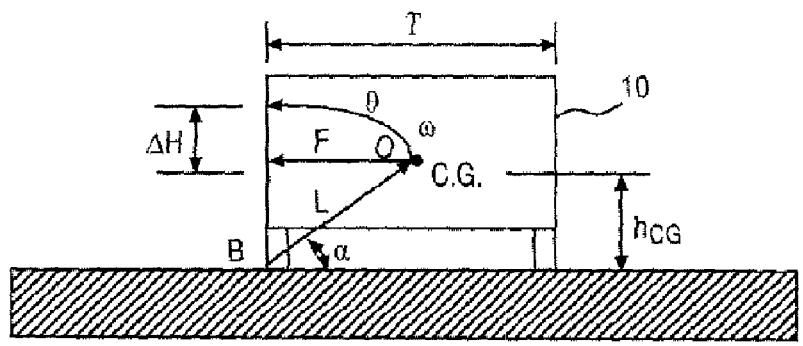
FIG. 2 is a simplified end view of an automotive vehicle at rest according to the present invention.
Figure 3:
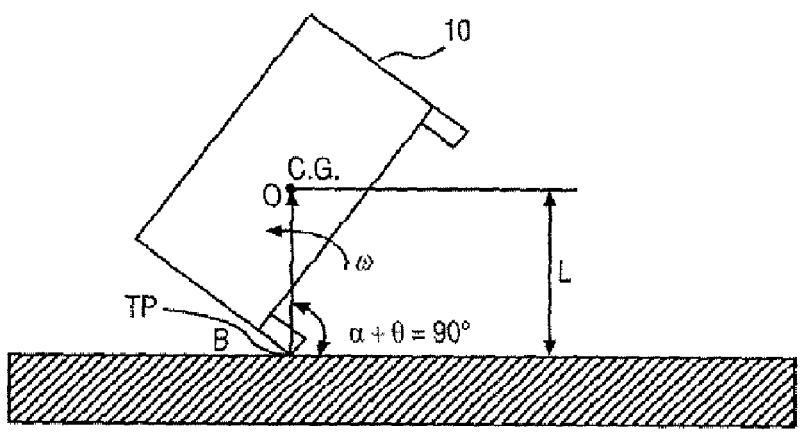
FIG. 3 is a simplified end view of an automotive vehicle at a rollover condition.

Referring now to FIGS. 2 and 3, energy-based criterion for a rigid body based on vehicle kinematics is illustrated by end view of automotive vehicle 10. In FIGS. 2 and 3, the potential energy which is required to cause the vehicle to roll depends on the change in height of the center of mass O, ΔH. This energy can be expressed as: E1=ΔHmg=(L−h)mg where m is the mass of the vehicle and g is the gravitational constant.

Also, the total energy a vehicle possesses consists of two parts, the potential energy and the kinematic energy.

$$E2 = (L \times \sin(\alpha + \theta) - h)\text{mg} + \frac{1}{2}I_O\omega^2$$

where θ is the angular displacement, Io is the moment of inertia of the vehicle with respect to the point O, the center of mass, and ω is the vehicle rotational velocity.

If the total energy E2 is greater than the potential energy E1, then the vehicle rollover will occur. An index (or measurement), $I_{Index}$ can be defined as $I_{Index}$=E1−E2, which when substituted from above is:

$$I_{Index} = L(1 - \sin(\alpha + \theta))\text{mg} - \frac{1}{2}I_O\omega^2$$

where α=a tan(2h/T) which is the so-called "Stability Index" for propensity using the vehicle center of gravity CG height and track width as parameters.

The trip point (TP) of the vehicle and lateral force F on the vehicle is also illustrated.

Figure 4:
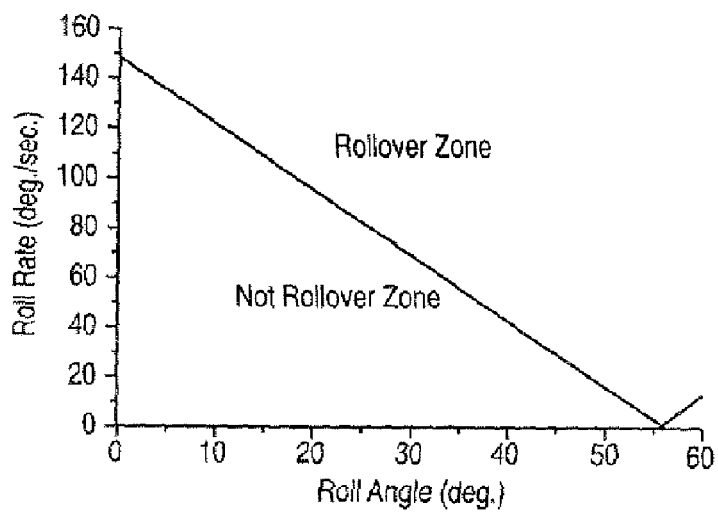
FIG. 4 is a plot of roll rate versus roll angle showing an energy-based roll threshold for a vehicle.
Figure 5:
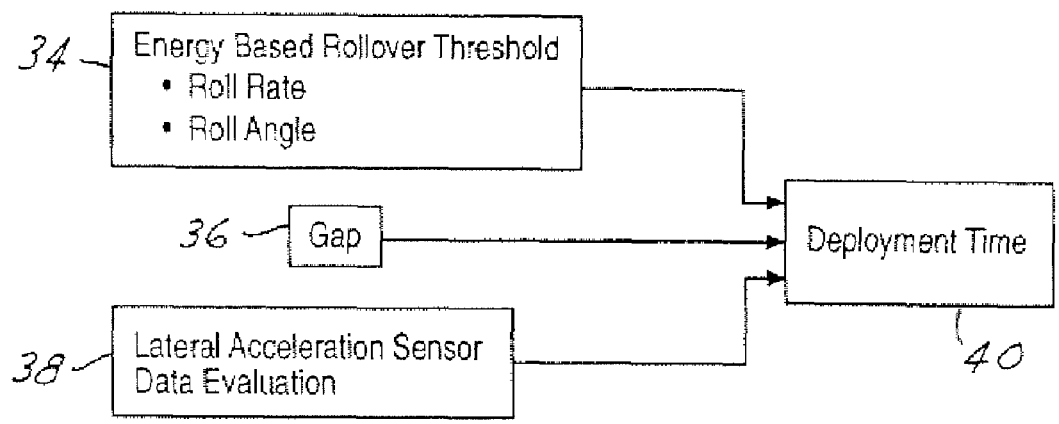
FIG. 5 is a simplified block diagram of a deployment process employing a rollover detection system according to the present invention.

Referring now to FIG. 5, functional block diagram of a deployment system according to the present invention is illustrated. An energy-based rollover threshold block 34, a gap block 36, and a lateral acceleration sensor data block 38 provide input to a deployment time block 40. Energy-based rollover threshold 34 is determined as described above with respect to FIGS. 2 through 4. Gap 36 is defined as the amount of clearance from the body of the vehicle occupant to the inside of the vehicle. Depending on the particular occupant restraint, gap may be defined as the distance from the head of the occupant to the inside of the vehicle or from the shoulder of the occupant to the inside of the vehicle.

Lateral acceleration data block 38 is derived from the lateral acceleration sensors. Preferably, the lateral acceleration sensor signal is filtered as would be evident to those skilled in the art. Lateral acceleration sensor data 38 provides an indication as to the severity and speed of the lateral movement of the vehicle and thus indicating how fast the occupant's movement to the gap closure.

Deployment time block 40 is preferably performed in control circuit 16. A time-to-fire is derived from the energy-based rollover threshold and block 34. Also, a time-to-fire based on the gap requirement is determined in block 36. The deployment time block 40 may thus provide a deployment time based on the energy-based rollover threshold and gap requirement 36. In practice, these two elements are considered together to determine an overall deployment time. Lateral acceleration sensor data 38 provides an indication as to the severity of an event. If the severity of an event is above a predetermined level as indicated by lateral acceleration 38, the energy-based threshold may be required to be reduced by a predetermined amount. Thus, if lateral acceleration sensor data is above a predetermined internal acceleration, the energy-based threshold is reduced a predetermined amount so that the time-to-fire is reduced. The amount of the reduction will depend on the particular vehicle dynamics and structure.

In a production setting, the various parameters may be stored in a lookup table within control circuit 16. Thus the time-to-fire or threshold based upon the energy of the vehicle and the gap may be reduced by a predetermined amount depending on the data from the lateral acceleration sensor.

Figure 6:
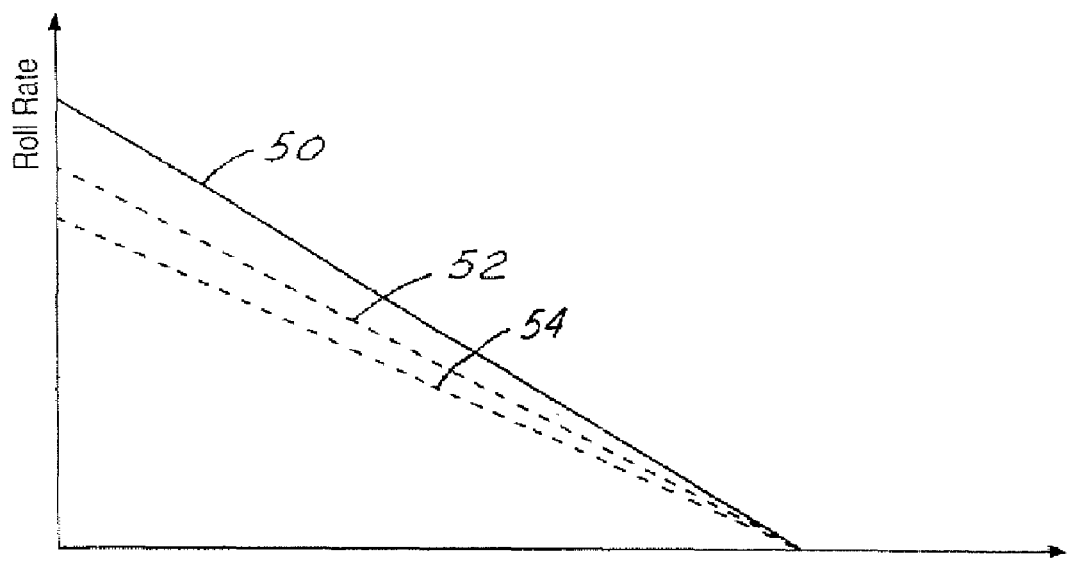
FIG. 6 is a plot of roll rate vs. roll angle for an energy-based threshold and an adjusted threshold using lateral acceleration data.

Referring now to FIG. 6, a plot of an energy-based threshold 50 (determined in blocks 34 and 40 above) may also have the gap requirement factored in. However, if lateral acceleration exceeds a predetermined amount, an adjusted threshold 52 may be used to determine the deployment time. As illustrated, the slope of the energy-based threshold is reduced to form adjusted threshold 52.

In another embodiment of the invention it may be desirable to factor in the effect of lateral acceleration on certain variables. According to the energy based rollover detection algorithm described above, the threshold relationship between the roll rate and roll angle is expressed as:

$$\omega = \sqrt{\frac{2L[1-\sin(\alpha+\theta)]mg}{I}} \quad (1)$$

where:
ω=Roll rate of the vehicle
L=Distance from trip point to vehicle CG=$([T/2]^2+[h_{cg}]^2)^{1/2}$ with T being the track width and $h_{cg}$ the vehicle center of gravity height
α=Angle between the line connecting the trip point and CG, and the vehicle baseline=$\tan^{-1}(2h_{cg}/T)$
θ=Roll angle
I=Roll moment of inertia of the vehicle
mg=weight of the vehicle This formula determines the rollover threshold described above. The threshold may result in a less accurate detection of fast rollover events in a timely fashion, due to exclusion of dynamic effect on the vehicle suspension system in this threshold. When the rollover initiation force become very large, the threshold will change significantly because of the following factors:
1) Change of the vehicle roll center, which affects the moment of inertia I in the above equation.
2) Change of the vehicle supporting point (or trip point TP) due to the suspension deformation in the lateral direction.

The vehicle center of rotation has an effect on the rollover propensity. The rotation center is very close to the vehicle CG during slow roll event, but will shift toward the vehicle roll anchor point in a rollover initiated by a larger lateral force. This large lateral force will cause the wheel to deform laterally, thus reducing the effective vehicle track width. The amount of deformation has been noticeable in side curb tripping and high G deceleration-type rollovers. Preliminary analysis based on test data on production vehicles has shown that these two factors may change by approximately 40%.

Based on the above discussions, the rollover threshold may be updated according to transferring of vehicle lateral kinetic energy rate. Acceleration, which is directly proportional to the lateral energy rate and/or force, may be used as an indicator for transferring of vehicle lateral kinetic energy rate. Therefore, parameters given in Equation (1) may be expressed as a function of lateral acceleration. This is set forth with the parenthetical (a). The threshold can be modified as shown in the following expression:

$$\omega = \sqrt{\frac{2L(a)[1-\sin(\alpha(a)+\theta)]mg}{I(a)}}$$

After analysis of numerous test data, it is found that the vehicle effective rollover moment of inertia changes from $I_o$ to $I_B$, where $I_o$ is the moment of inertia with respect to the vehicle CG while $I_B$ is to the roll pivoted point at the outer edge of the tire. This has allowed development of a more efficient rollover threshold. How much the wheel is deformed depends on different chassis design and vehicle loading. Though important, this deformation actually has a lesser degree of effect than the roll center.

Establishment of the rollover algorithm can be achieved by using this explicit rollover threshold with much less physical tests. High speed curb trip rollover testing is deemed to be important for representation of larger lateral force G level scenario. Since both roll and non-roll cases are required to calibrate the algorithm at the upper boundary from this dynamic effect, computed aided-engineering (CAE) models which have been already correlated to this extreme event can then be used to provide additional vehicle kinematics signals related to low and medium G level rollover events such as critical sliding velocity (CSV), deceleration type rollover and cork screw.

Figure 7:
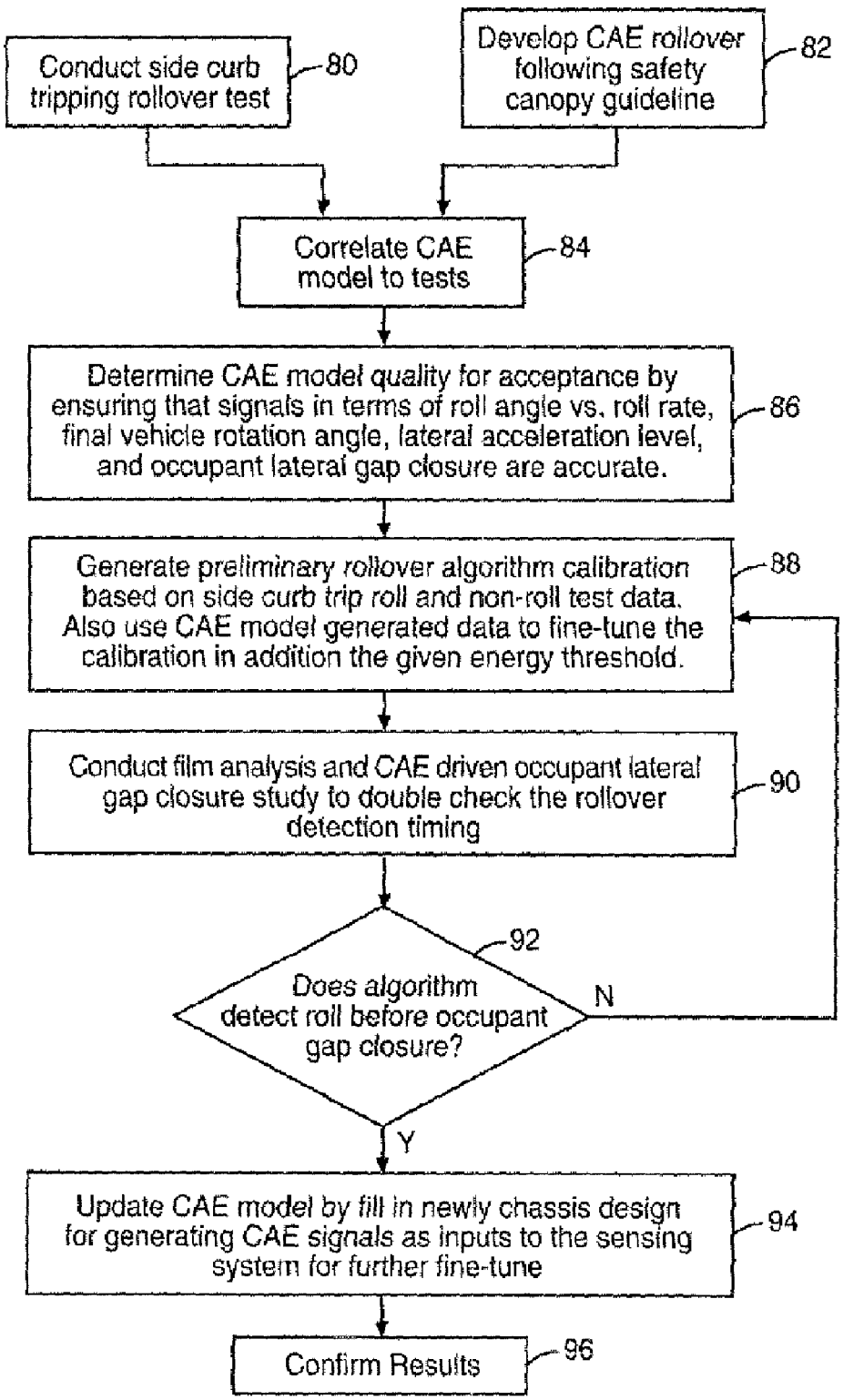
FIG. 7 is a method of determining a rollover threshold according to the present invention.

Referring now to FIG. 7, a rollover detection algorithm can be developed in accordance with appropriate steps in the proposed invention as given in the following flow chart.

In step 80, side curb tripping rollover testing is conducted to determine the impact of lateral forces on the distance from the trip point to the c.g., the angle between the line connecting the trip point and the c.g. and the roll moment of inertia of the vehicle. In step 82, computer aided engineering (CAE) is used to determine rollover following safety canopy guidelines. In step 84, the computer aided engineering (CAE) model is correlated with the tests performed in step 80. In step 86, the quality of the CAE model is determined for acceptance by insuring that the terms in the roll rate versus roll angle determination of the threshold, the final vehicle rotation angle, the lateral acceleration level, and the occupant lateral gap closure are accurate. In step 88, a preliminary rollover algorithm is generated based upon side curb tip up roll and non-test data. The CAE model generated is used to fine tune the calibration in addition to the energy based threshold. In step 90, a film analysis and CAE driven occupant lateral gap closure study is performed to double-check the rollover detection timing. In step 92, it is determined whether the algorithm detects roll gap before gap closure. If not, step 88 is again performed. If the algorithm detects roll before occupant gap closure, step 94 is performed. In step 94 the CAE model is updated by filling in a new chassis design for generating CAE signals as inputs to the sensing system for future fine tuning. In step 96, a confirmation of the results is performed using various tests. The various tests may include side curb tripping, deceleration sled, SAE J2114 and film analysis. As will be evident to those skilled in the art, the above method reduces the number of prototype vehicles required for development of a rollover control algorithm.

While particular embodiments of the invention have been shown and described, numerous variations alternate embodiments will occur to those skilled in the art. Accordingly, it is intended that the invention be limited only in terms of the appended claims.

What is claimed is:

1. A rollover sensing system configured to deploy an occupant restraint system aboard a vehicle having a suspension system including wheels with an associated track width, said rollover sensing system comprising:
   at least one lateral acceleration sensor configured to sense a lateral acceleration of said vehicle and accordingly generating a lateral acceleration signal;
   a roll rate sensor configured to sense a roll rate of said vehicle and accordingly generating a roll rate signal;
   a roll angle detector configured to sense or determining a roll angle of said vehicle and accordingly generating a roll angle signal; and
   a control circuit coupled to each said lateral acceleration sensor, said roll rate sensor, and said roll angle detector for communication therewith;
   wherein said control circuit includes logic configured to:
   (i) determine a trip point length related to said track width of said vehicle as a function of said lateral acceleration communicated via each said lateral acceleration signal so that said trip point length at least partially reflects any change in said track width resulting from deformation of said suspension system and said wheels that is caused by a rollover initiation force applied to said vehicle from a substantially lateral direction;

(ii) determine a rollover threshold according to said roll rate communicated via said roll rate signal, said roll angle communicated via said roll angle signal, said trip point length, and a roll moment of inertia of said vehicle; and (iii) generate a control signal according to said rollover threshold for thereby deploying said occupant restraint system.

2. A rollover sensing system as set forth in claim 1, wherein said control circuit also includes logic for:
determining a trip point angle of said vehicle as a function of said lateral acceleration; and
determining aid rollover threshold also according to said trip point angle.

3. A rollover sensing system as set forth in claim 1, wherein said control circuit also includes logic for:
determining said roll moment of inertia as a function of said lateral acceleration.

4. A rollover sensing system as set forth in claim 1, wherein said control circuit also includes logic for;
determining said roll moment of inertia as a function of said lateral acceleration;
determining a trip point angle of said vehicle as a function of said lateral acceleration; and
determining said rollover threshold also according to said trip point angle.

5. A rollover sensing system as set forth in claim 1, wherein said roll angle detector comprises a discrete sensor, and said roll angle and said roll rate are sensed independently by said discrete sensor and said roll rate sensor.

6. A rollover sensing system as set forth in claim 1, wherein said roll angle is determined by said roll angle detector from aid roll rate signal generated by said roll rate sensor.

7. An occupant restraint system for a vehicle having a suspension system including wheels with an associated track width, said occupant restraint system comprising:
an occupant restraint;
a deployment circuit coupled to said occupant restraint;
at least one lateral acceleration sensor configured to sense a lateral acceleration of said vehicle and accordingly generating a lateral acceleration signal;
a roll rate sensor configured to sense a roll rate of said vehicle and accordingly generating a roll rate signal;
a roll angle detector configured to sense or determining a roll angle of said vehicle and accordingly generating a roll angle signal; and
a control circuit coupled to said deployment circuit, each said lateral acceleration sensor, said roll rate sensor, and said roll angle detector for communication therewith;
wherein said control circuit includes logic configured to:
(i) determine a trip point length, a roll moment of inertia, and a trip point angle of said vehicle as a function of said lateral acceleration communicated via each said lateral acceleration signal so as to at least partially compensate for any change in said track width resulting from deformation of said suspension system and said wheels that is caused by a rollover initiation force applied to said vehicle from a substantially lateral direction;

(ii) determine a rollover threshold according to said roll rate communicated via said roll rate signal, said roll angle communicated via said roll angle signal, said trip point length, said roll moment of inertia, and said trip point angle; and (iii) generate a control signal according to said rollover threshold for thereby deploying said occupant restraint via said deployment circuit.

8. An occupant restraint system as set forth in claim 7, wherein said roll angle detector comprises a discrete sensor, and said roll angle and said roll rate are sensed independently by said discrete sensor and said roll rate sensor.

9. An occupant restraint system as set forth in claim 7, wherein said roll angle is determined by said roll angle detector from said roll rate signal generated by said roll rate sensor.

10. An occupant restraint system as set forth in claim 7, wherein said occupant restraint comprises at least one airbag.

11. An occupant restraint system as set forth in claim 7, wherein said rollover threshold is energy-based.

12. An occupant restraint system as set forth in claim 7, wherein said rollover threshold is a time to fire.

13. An occupant restraint system as set forth in claim 7, wherein said rollover threshold is a function of a gap requirement.

14. A rollover sensing system configured to deploy an occupant restraint system aboard a vehicle having a suspension system including wheels with an associated track width, said rollover sensing system comprising:
at least one lateral acceleration sensor configured to sense a lateral acceleration of said vehicle and accordingly generating a lateral acceleration signal;
a roll rate sensor configured to sense a roll rate of said vehicle and accordingly generating a roll rate signal;
a roll angle detector configured to sense or determining a roll angle of said vehicle and accordingly generating a roll angle signal; and
a control circuit coupled to each said lateral acceleration sensor, said roll rate sensor, and said roll angle detector for communication therewith;
wherein said control circuit includes logic configured to:
(i) determine a dimension distance related to said track width of said vehicle as a function of aid lateral acceleration communicated via each said lateral acceleration signal so that said dimension distance at least partially reflects any change in said track width resulting from deformation of said suspension system and said wheels that is caused by a rollover initiation force applied to said vehicle from a substantially lateral direction;
(ii) determine a rollover threshold according to said roll rate communicated via said roll rate signal, said roll angle communicated via said roll angle signal, and said dimension distance; and
(iii) generate a control signal according to said rollover threshold for thereby deploying said occupant restraint system.

* * * * *